United States Patent [19]
Fujita et al.

[11] Patent Number: 5,345,843
[45] Date of Patent: Sep. 13, 1994

[54] SPEED CHANGE CONTROL APPARATUS AND METHOD FOR AN AUTOMOTIVE AUTOMATIC TRANSMISSION

[75] Inventors: Kenjiro Fujita, Kusatsu; Katsutoshi Usuki, Kyoto, both of Japan

[73] Assignee: Mitsubishi Jidosha Kogyo Kabushiki Kaisha, Tokyo, Japan

[21] Appl. No.: 36,274

[22] Filed: Mar. 24, 1993

[30] Foreign Application Priority Data

Mar. 24, 1992 [JP] Japan ................... 4-065916

[51] Int. Cl.⁵ ............................................ B60K 41/18
[52] U.S. Cl. .................................. 477/98; 364/424.1
[58] Field of Search ............ 74/866, 844, 856; 364/424.1

[56] References Cited

U.S. PATENT DOCUMENTS

| | | | |
|---|---|---|---|
| 5,189,611 | 2/1993 | Petzold et al. | 74/866 |
| 5,217,086 | 6/1993 | Morimoto | 74/866 |
| 5,235,875 | 8/1993 | Yoshida et al. | 74/866 |
| 5,239,896 | 8/1993 | Otsubo et al. | 74/866 |
| 5,249,482 | 10/1993 | Okahara et al. | 74/866 |

*Primary Examiner*—John T. Kwon

[57] ABSTRACT

A speed change control method and apparatus for an automotive automatic transmission includes a controller, which selects a shift pattern in which shift lines are set as a function of both throttle opening and vehicle speed when the temperature of operating oil of the transmission is higher than a predetermined temperature, and selects a shift pattern in which shift lines are set as a sole function of the vehicle speed when the operating oil temperature is lower than or equal to the predetermined temperature. The controller refers to the selected shift pattern, and determines a gear to be established, in accordance with a corresponding one or both of the vehicle speed and the throttle opening detected by sensors, to thereby reduce the frequency in occurrence of shift shock when the operating oil temperature is low.

6 Claims, 3 Drawing Sheets

SPEED CHANGE CONTROL APPARATUS AND METHOD FOR AN AUTOMOTIVE AUTOMATIC TRANSMISSION

BACKGROUND OF THE INVENTION

The present invention relates to a speed change control apparatus and method for an automotive automatic transmission, and more particularly, to a speed change control apparatus capable of reducing the delay in shift response and reducing shift shock, even when the temperature of operating oil of the automatic transmission is low.

Motor vehicles are equipped with an automatic transmission for automatically setting an optimal transmission gear ratio in order to properly transmit power generated by an engine to drive wheels in accordance with vehicle operating conditions. A typical automatic transmission for vehicles comprises an input shaft and an output shaft coupled, respectively, to an engine output shaft and drive wheels, and a plurality of rotating elements (rotating drum, gear wheels, etc.) forming a power transmission path between the input and output shafts. The transmission further comprises a plurality of hydraulic frictional engaging elements (clutches, brakes, etc.) associated with the rotating elements for selectively establishing a power transmission path, i.e., a transmission gear ratio, between the input and output shafts, a speed change control apparatus responsive to various sensor outputs representing vehicle operating conditions, and an electricity-hydraulic pressure converter provided between the control apparatus and the frictional engaging elements. The speed change control apparatus includes a memory for storing a shift diagram in which a plurality of shift lines are individually set as a function of a state parameter (e.g., throttle opening and vehicle speed) relating to the vehicle operating conditions. To prevent unstable travel caused by frequent shifting near a shift point at which shift is effected, there is provided a difference (hysteresis) between the shift point applied at the time of increase of the vehicle speed and the shift point applied at the time of decrease of the vehicle speed. Specifically, downshift lines are generally set on a lower-speed side than the corresponding upshift lines.

During operation of the vehicle, in order to establish a gear suited to the vehicle operating conditions, application of the hydraulic pressure to the frictional engaging elements is controlled by the electricity-hydraulic pressure converter under the control of the speed change control apparatus, in accordance with the vehicle operating conditions. For example, during a shift from a higher-speed gear to a lower-speed gear, the frictional engaging elements for establishing the higher-speed gear are disengaged while the frictional engaging elements for establishing the lower-speed gear are engaged. As a result, only the required ones of the rotating elements are selected and rendered operative so as to form a power transmission path, whereby the gear transmission ratio between the input and output shafts of the transmission is changed to establish the necessary gear.

Typically, the frictional engaging element has friction members for engagement and disengagement with respect to each other, a piston actuated by hydraulic pressure for pressing the friction members against each other, a cylinder containing the piston, etc. When the frictional engaging element is in a disengaged state, the piston assumes a standby position where there is a sufficient clearance between the piston and the friction members, thereby preventing drag torque. When engaging the frictional engaging element, hydraulic pressure is introduced into the cylinder such that the piston at the standby position is first moved to an engagement start position at which the piston contacts the friction member. In other words, the piston is moved over an ineffective stroke from the standby position to the engagement start position to eliminate the dead space. Thereafter, hydraulic pressure is further applied to gradually engage the friction members with each other. To quickly carry out the shift operation, a maximum hydraulic pressure is introduced into the cylinder while the piston moves through the ineffective stroke, to thereby eliminate the dead space in the shortest possible time.

If, during travel of the vehicle, the accelerator pedal is frequently depressed and released, the operating point in the shift diagram frequently crosses the upshift or downshift line based upon change in the throttle opening. Thus, an upshift or downshift takes place each time the upshift or downshift line is crossed. Meanwhile, when the temperature of the operating oil of the automatic transmission is low, the viscosity of the operating oil is large. Thus, the "release" and "application" of the hydraulic pressure is prolonged, lowering the hydraulic pressure response, the output hydraulic pressure characteristic of solenoid valves used in electronic controlled automatic transmissions, etc. Consequently, when the operating oil temperature is low, supply of the hydraulic pressure cannot follow the frequent shifting as previously mentioned, and a disadvantage arises in that the shift time is prolonged, or that shift shock occurs due to deficiency of the operating oil pressure.

SUMMARY OF THE INVENTION

An object of the present invention is to provide a speed change control apparatus and method for an automotive automatic transmission which can reduce the delay of shift response and the shift shock when the temperature of operating oil is low and thus the viscosity thereof is high.

The aforementioned and other objects of the present invention are fulfilled by providing a speed change control apparatus used for an automatic transmission of a vehicle in which required ones of a plurality of frictional engaging elements are engaged or disengaged to establish a required one of a plurality of gears. The speed change control apparatus comprises cold state detecting means for detecting a temperature associated with the vehicle; first memory means for storing a first shift pattern in which shift lines are individually set as a function of both a lead of an engine of the vehicle and a vehicle speed; second memory means for storing a second shift pattern in which shift lines are individually solely set as a function of the vehicle speed; selecting means for selecting the first shift pattern when the detected temperature associated with the vehicle is higher than a predetermined temperature, and for selecting the second shift pattern when the detected temperature associated with the vehicle is, at most, equal to the predetermined temperature; and gear determining means for determining a gear to be established based upon the selected shift pattern.

Preferably, the cold state detecting means detects the temperature of operating oil of the automatic transmission or the temperature of cooling water of the engine.

The aforementioned and other objects of the present invention are still further fulfilled by providing a speed change control method for use in conjunction with an automatic transmission of a vehicle in which required ones of a plurality of frictional engaging elements are engaged or disengaged to establish a required one of a plurality of gears. The speed change control method comprises:

(a) prestoring a first shift pattern in which shift lines are individually set as a function of both load of an engine of the vehicle and a speed of the vehicle;

(b) prestoring a second shift pattern in which shift lines are individually set solely as a function of the vehicle speed;

(c) detecting a temperature associated with the vehicle;

(d) selecting the first prestored shift pattern upon detecting the temperature in step (c) to be higher than a predetermined temperature;

(e) selecting the second prestored shift pattern upon detecting the temperature in step (c) to be, at most, equal to the predetermined temperature; and (f) determining a gear to be established based upon the selected one of the first and second prestored shift patterns.

An advantage of the present invention resides in that when the temperature of the vehicle is low, the gear is selected independent of the engine lead, e.g., the throttle opening, and dependent solely upon the vehicle speed. Since change of the vehicle speed is less severe than change of the throttle opening caused by the driver's operation of the accelerator pedal, shift does not readily take place following frequent operation of the accelerator pedal, whereby the somesthetic delay of shift response, which is attributable to increase of the viscosity of the operating oil when the oil temperature is low, is reduced, and the frequency in occurrence of shift shock, which would make the passengers feel uncomfortable, is lessened.

These and other objects and advantages will become more readily apparent from an understanding of the preferred embodiments described below with reference to the following drawing figures.

BRIEF DESCRIPTION Of THE DRAWINGS

The invention will become more fully understood from the detailed description herein below with reference to the accompanying figures, given by way of illustration only and not intended to limit the present invention in which.

DETAILED DESCRIPTION Of THE INVENTION

Figure 1:
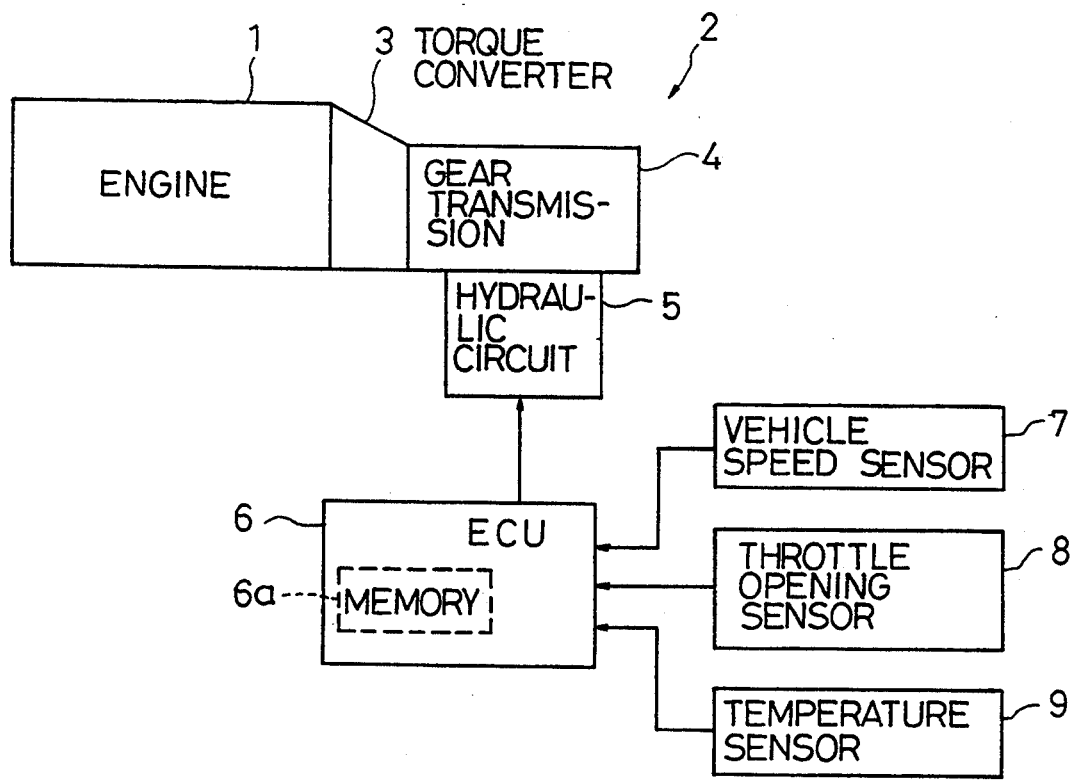
FIG. 1 is a block diagram of an automatic transmission equipped with a speed change control apparatus according to one embodiment of the present invention.

Referring first to FIG. 1, an automotive automatic transmission 2, which transmits power generated by an internal combustion engine 1 to drive wheels (not shown), comprises a torque converter 3, a gear transmission 4, a hydraulic circuit 5, a controller 6, and other elements.

Although not illustrated in detail, the torque converter 3 includes a casing, an input shaft coupled to the crank shaft of the engine 1 and an output shaft coupled to an input shaft Sa of the gear transmission 4. Torque is transmitted from a pump impeller, mounted on the input shaft which is coupled to the crank shaft, to a turbine liner mounted on the output shaft. A stator is mounted to the casing via a one-way clutch.

Figure 2:
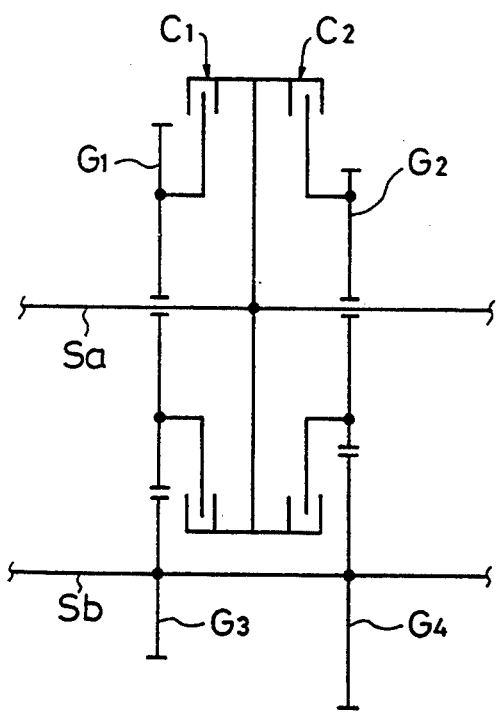
FIG. 2 is a schematic diagram showing part of a gear train in a gear transmission of the automatic transmission shown in FIG. 1.

The gear transmission 4 is, for example, a four-speed type, and part thereof is shown in FIG. 2. Specifically, the gear transmission 4 comprises the input shaft Sa coupled to the output shaft of the torque converter 3, an output shaft Sb coupled to the drive wheels, rotating elements such as gear wheels, hydraulic clutches and hydraulic brakes. The rotating elements and the frictional engaging elements form a power transmission path between the input and output shafts. Required frictional engaging elements are engaged or disengaged to select rotating elements through which power is to be transmitted, to thereby establish a desired power transmission path, i.e., a desired gear. When, for example, a clutch C1 of the gear transmission 4 is in engagement with a first driving gear wheel G1, a first gear (e.g., first speed) is established wherein rotation of the input shaft Sa is transmitted to an intermediate transmission shaft Sb through the clutch C1, the first driving gear wheel G1, and a first driven gear wheel G3. When a clutch C2 is engaged with a second driving gear wheel G2, a second gear (e.g., second speed) is established wherein rotation of the input shaft Sa is transmitted to the intermediate transmission shaft Sb through the clutch C2, the second driving gear wheel G2, and a second driven gear wheel G4. To upshift from the first to the second speed, the second-speed clutch C2 is engaged while the first-speed clutch C1 is disengaged. Conversely, to downshift from the second to the first speed, the clutch C1 is engaged while the clutch C2 is disengaged.

Usually, a hydraulic multiple disc clutch is used for the clutches C1 and C2, and when the clutch is brought to an engaged state from a disengaged state, first, the piston of the clutch is moved over an ineffective stroke from a standby position where a sufficient clearance is provided to prevent drag torque, to a position where the clearance is substantially zero, to thereby eliminate the dead space, and thereafter the frictional engaging discs are gradually engaged.

The movement of the piston over the ineffective stroke causes a loss of time with respect to the total shift time. Therefore, a maximum hydraulic pressure should preferably be applied lo the clutch while the piston moves through the ineffective stroke, to eliminate the aforesaid dead space in the shortest possible time. To this end, the length of the ineffective stroke and a maximum hydraulic pressure supply time are prestored in a memory 6a of the controller 6. When eliminating the dead space, the maximum hydraulic pressure is applied to the clutch for the maximum hydraulic pressure supply time stored in the memory 6a, to quickly move the piston to the position just before the engagement start position.

The hydraulic circuit 5 includes a duty-controlled solenoid valve (not shown) for controlling the application and release of hydraulic pressure to and from the individual speed change frictional engaging elements. A duty-controlled solenoid valve may be provided for each of the speed change frictional engaging elements, i.e., for each clutch or brake, so that the solenoid valves may be controlled independent of one another. The solenoid valve is connected to the output side of the controller 6, and is actuated in accordance with a drive signal from the controller 6, to control the operating oil pressure.

The automatic transmission 2 constructed as above is provided with a speed change control apparatus for controlling the operation of the transmission 2. The speed change control apparatus according to one embodiment of the present invention includes the controller 6 as a principal element. The controller 6 is composed of the memory 6a, a central processing unit (not shown), an input/output device (not shown), etc., all built therein. The memory 6a stores a normal map which prescribes a shift pattern (first shift pattern) used when the temperature of the operating oil in the transmission 2 is higher than a predetermined temperature, and a low-temperature map which prescribes a shift pattern (second shift pattern) used when the operating oil temperature is lower than or equal to the predetermined temperature.

Figure 3:
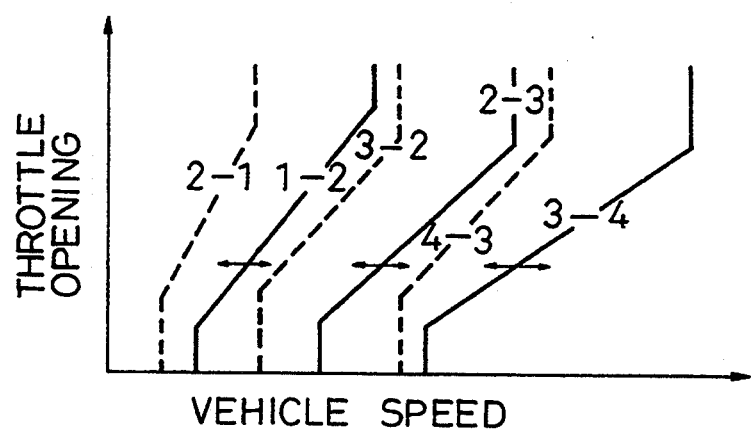
FIG. 3 is a graph showing an example of a first shift pattern stored in a memory of FIG. 1.
Figure 4:
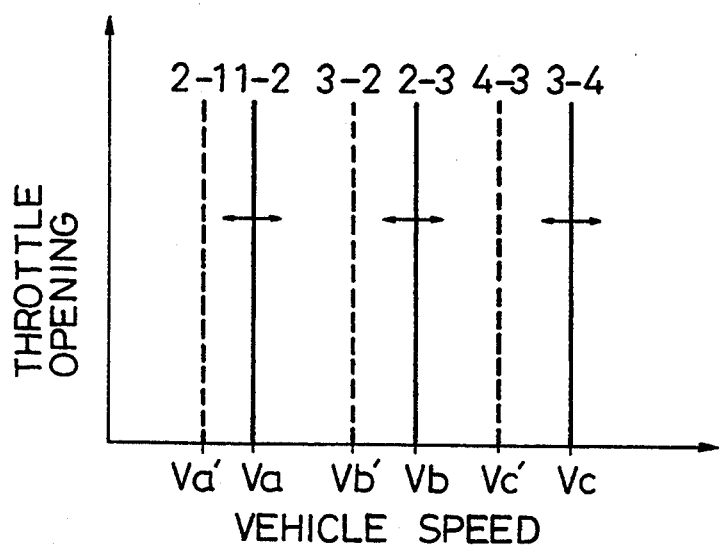
FIG. 4 is a graph showing an example of a second shift pattern stored in the memory of FIG. 1.

As shown in FIG. 3, the shift pattern prescribed by the normal map includes, e.g., three pairs of shift lines, which are individually expressed as a function of both throttle opening representing the engine load, and vehicle speed. The shift pattern prescribed by the low-temperature map includes, e.g., three pairs of shift lines, which are individually expressed as a sole function of vehicle speed, as shown in FIG. 4. In FIGS. 3 and 4, the solid lines indicate upshift lines, and the dashed lines indicate downshift lines, each upshift line and the corresponding downshift line forming a pair of shift lines. A difference (i.e., hysteresis) is provided between the upshift point and the downshift point, so that upshift and downshift do not take place too frequently while the traveling condition of a vehicle is near the shift point.

A vehicle speed sensor 7, a throttle opening sensor 8, a temperature sensor 9, etc., are connected to the input side of the control lot 6. The vehicle speed sensor 7 detects the speed of the vehicle and outputs a corresponding vehicle speed signal, and the throttle opening sensor 8 detects the throttle opening of the engine and outputs a corresponding throttle opening signal. The temperature sensor 9 detects the temperature of the oil in the hydraulic circuit 5 and outputs a corresponding temperature signal. Instead of the temperature sensor 9, a sensor for detecting a vehicle temperature, e.g., the temperature of cooling water of the engine, may be used to determine whether the vehicle is in a cold state. The vehicle speed signal, the throttle opening signal, and the temperature signal are supplied to the controller 6. The controller 6, which functions as a shift pattern selecting device and a gear determining device of the speed change control apparatus, controls the hydraulic circuit 5 in accordance with the signals supplied from the sensors 7 to 9 with use of a selected one of the normal map and the low-temperature map, to thereby carry out a shift operation.

A shift control process executed by the controller 6 will be now described with reference to FIG. 5.

Figure 5:
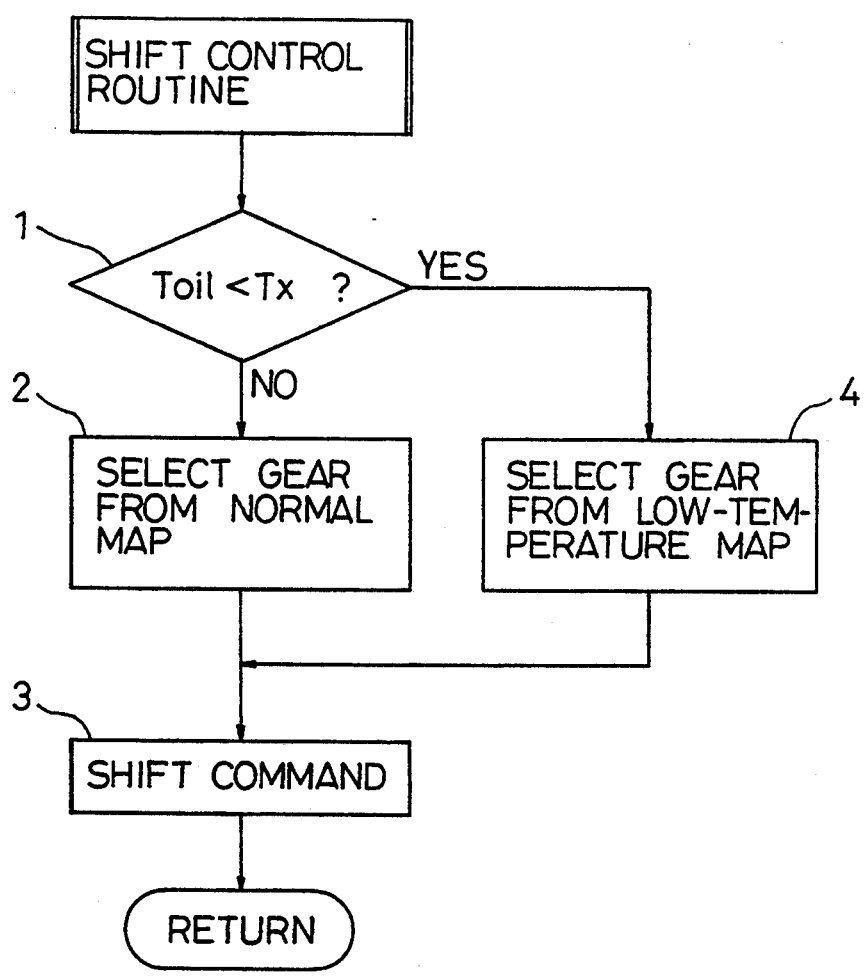
FIG. 5 is a flow chart showing a shift control process executed by a controller shown in FIG. 1.

In the shift control routine shown in FIG. 5, the controller 6 as the shift pattern selecting device determines, based on the temperature signal supplied from the temperature sensor 9, whether the temperature Toil of the operating oil in the hydraulic circuit 5 is lower than or equal to a predetermined temperature Tx (e.g., $-20°$ C.) (Step S1). If the result of this determination is NO, the normal map is selected. As shown in FIG. 3, the normal map prescribes the shift pattern (first shift pattern) which is dependent on both the throttle opening and the vehicle speed. Subsequently, the controller 6, as the gear determining device, refers to the normal map thus selected, and determines a gear to be established, in accordance with the vehicle speed signal and the throttle opening signal supplied from the vehicle speed sensor 7 and the throttle opening sensor 8, respectively (Step S2). The controller 6 then supplies a shift command to the hydraulic circuit 5 to establish the gear determined in Step S2 (Step S3), and ends the execution of the shift control routine for the present cycle. After the shift command is output, the suitable gear is established.

When the result of the determination in Step S1 is YES, i.e., when the operating oil temperature is lower than or equal to a predetermined temperature such as $-20°$ C., the controller 6, as the shift pattern selecting device, selects the low-temperature map. As shown in FIG. 4, the low-temperature map prescribes the shift pattern (second shift pattern) which is dependent on the vehicle speed alone. Namely, this shift pattern is not dependent upon the throttle opening. Subsequently, referring to the low-temperature map thus selected, the controller 6, as the gear determining device, determines a gear to be established, in accordance only with the vehicle speed signal supplied from the vehicle speed sensor 7 (Step S4). The controller 6 then outputs a shift command to the hydraulic circuit 5 to establish the gear determined in Step S4 (Step S3), and ends the execution of the shift control routine for the present cycle.

Specifically, while the operating oil temperature is lower than the predetermined temperature Tx, the controller 6 operates as follows: When it is determined based on the vehicle speed signal from the vehicle speed sensor 7 that the vehicle speed is lower than or equal to a first predetermined vehicle speed Va, the controller 6 outputs a shift command to establish the first speed; when the vehicle speed becomes higher than the predetermined vehicle speed Va, the controller outputs a shift command to establish the second speed; and when the vehicle speed becomes higher than a second predetermined vehicle speed Vb ($>$ Va) higher than the first predetermined vehicle speed Va, the controller outputs a shift command to establish the third speed. For example, when the vehicle speed becomes lower than or equal to a predetermined vehicle speed Vb' ($<$ Vb) while the vehicle is traveling in the third speed, the controller 6 outputs a shift command to effect a shift from the third to the second speed.

Generally, change of the vehicle speed is less intense than change of the throttle opening caused by operation of the accelerator pedal by the driver. Thus, while the vehicle is in a cold state in which the automatic transmission 2 is operated based on the shift pattern dependent solely on the vehicle speed, repeated upshift and downshift does not occur even if the accelerator pedal is frequently operated, and the frequency in occurrence of shift shock, which would make the driver feel uncomfortable, is lessened.

The present invention is not limited to the above-described embodiment and various modifications may be made.

For example, although in the foregoing embodiment, the hydraulic clutch is mentioned as an example of the speed change frictional engaging element in an automatic transmission, such a speed change frictional engaging element may be a speed change brake. Further, the present invention is applicable to various types of automatic transmissions equipped with a driving force transmission device other than the torque converter.

From the above-described embodiments of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. A speed change control apparatus used for an automatic transmission of a vehicle in which required ones of a plurality of frictional engaging elements are engaged or disengaged to establish a required one of a plurality of gears, comprising:

cold state detecting means for detecting a temperature associated with the vehicle;

first memory means for storing a first shift pattern in which shift lines are individually set as a function of both a load of an engine of the vehicle and a vehicle speed;

second memory means for storing a second shift pattern in which shift lines are individually set solely as a function of the vehicle speed;

selecting means for selecting the first shift pattern when the detected temperature associated with the vehicle is higher than a predetermined temperature, and for selecting the second shift pattern when the detected temperature associated with the vehicle is, at most, equal to the predetermined temperature; and gear determining means for determining a gear to be established based upon the selected shift pattern.

2. The speed change control apparatus of claim 1, wherein the cold state detecting means detects a temperature of operating oil of the automatic transmission.

3. The speed change control apparatus of claim 1, wherein the cold state detecting means detects a temperature of cooling water of the engine.

4. A speed change control method for use conjunction with an automatic transmission of a vehicle in which required ones of a plurality of frictional engaging elements are engaged or disengaged to establish a required one of a plurality of gears, comprising the steps of:

(a) prestoring a first shift pattern in which shift lines are individually set as a function of both load of an engine of the vehicle and a speed of the vehicle;

(b) prestoring a second shift pattern in which shift lines are individually set solely as a function of the vehicle speed;

(c) detecting a temperature associated with the vehicle;

(d) selecting the first prestored shift pattern upon detecting the temperature in step (c) to be higher than a predetermined temperature;

(e) selecting the second prestored shift pattern upon detecting the temperature in step (c) to be, at most, equal to the predetermined temperature; and (f) determining a gear to be established based upon the selected one of the first and second prestored shift patterns.

5. The speed change method of claim 4, wherein the temperature detected in step (c) is a temperature off operating oil of the automatic transmission.

6. The speed change method of claim 4, wherein the temperature detected in step (c) is a temperature of cooling water of the engine.

* * * * *